F. L. STUART.
APPARATUS FOR STORING COAL, ORE, AND OTHER MATERIALS.
APPLICATION FILED MAR. 19, 1918.
1,354,226.
Patented Sept. 28, 1920.
2 SHEETS—SHEET 1.
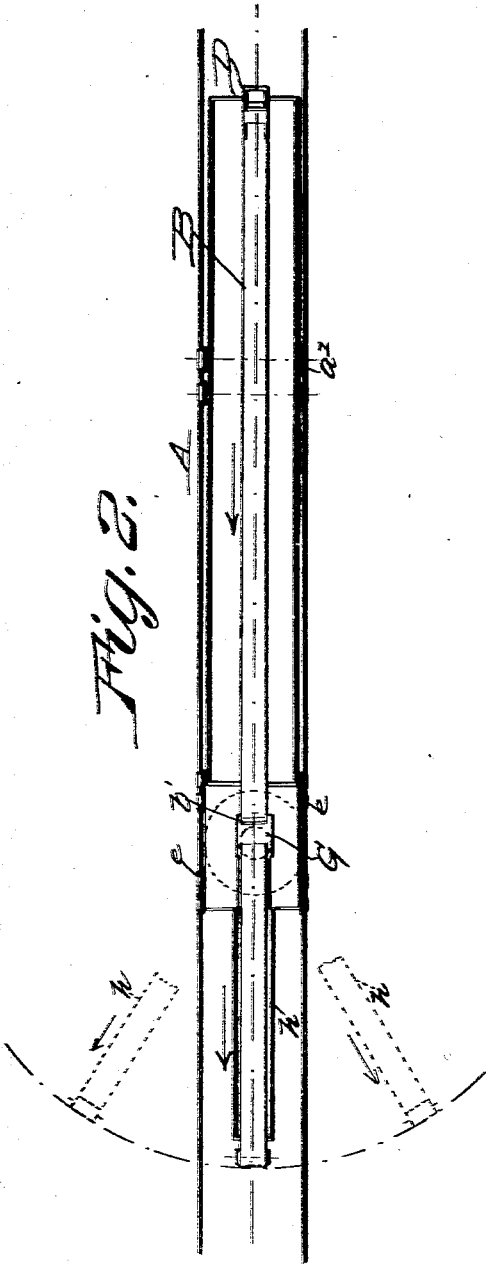
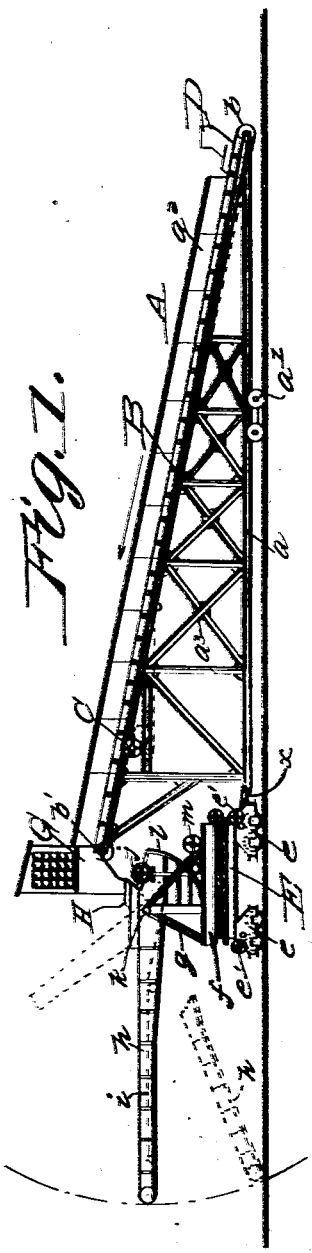
Inventor
Francis Lee Stuart,
By his Attorneys F. L. STUART.
APPARATUS FOR STORING COAL, ORE, AND OTHER MATERIALS.
APPLICATION FILED MAR. 19, 1918.
1,354,226.
Patented Sept. 28, 1920.
2 SHEETS—SHEET 2.
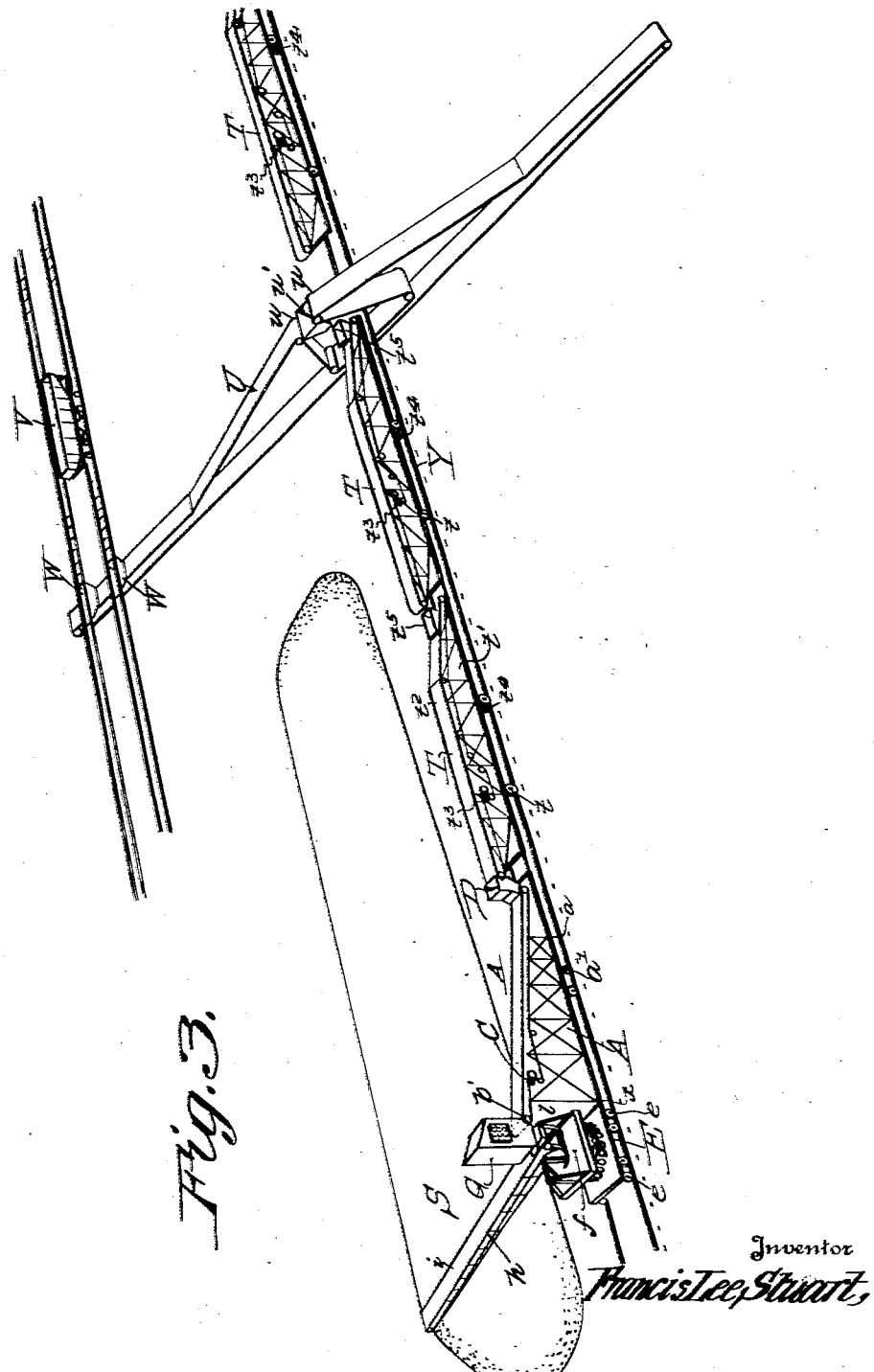

UNITED STATES PATENT OFFICE.

FRANCIS LEE STUART, OF WASHINGTON, DISTRICT OF COLUMBIA, ASSIGNOR TO INTERNATIONAL CONVEYOR CORPORATION, OF NEW YORK, N. Y.

APPARATUS FOR STORING COAL, ORE, AND OTHER MATERIALS.

1,354,226.  Specification of Letters Patent.  Patented Sept. 28, 1920.

Application filed March 19, 1918. Serial No. 223,302.

*To all whom it may concern:*

Be it known that I, FRANCIS LEE STUART, a citizen of the United States, residing in Washington, District of Columbia, have invented certain new and useful Improvements in Apparatus for Storing Coal, Ore, and other Materials, of which the following is a specification.

This invention relates to apparatus for storing coal, ore and other materials supplied to it by suitable conveyer or conveyers. The primary object of the invention is to provide a self-contained apparatus, which I call a stacker, which can be moved to any required place, readily shifted from time to time, and which is provided with a motor driven conveyer receiving material from another independently operated conveyer, and which delivers to another motor driven conveyer which discharges or deposits the material and which is adjustable in such manner that it may be shifted as required to deposit the material on any desired part of the pile being formed. Such apparatus may also be employed for loading cars, vessels, and other carriers.

In carrying out my invention, I provide a suitable frame supported on wheels and carrying an inclined conveyer belt which is driven by a motor carried by the frame. At its lower end the frame carries a hopper delivering to the conveyer belt and at its upper end the frame carries a chute to which the upper end of the conveyer belt delivers.

The frame is connected at its lower end to a truck carrying a turn-table on which is mounted a supporting frame carrying the frame of a conveyer belt. This last mentioned frame is pivotally connected with its supporting frame and is provided at its inner end with toothed segments which are operated by motor driven gearings carried by the turn-table. The frame of the conveyer belt carries a motor by which said belt is driven.

The organization is such that the delivery conveyer may be adjusted to any desired point in any required direction to deposit the material being handled wherever required.

As a whole, the stacker is self-contained. It can be moved under its own power to any place desired without disturbing the conveyer or conveyers which deliver to it. The delivery conveyer is operated by a motor carried by its own frame, and said delivery conveyer can be adjusted as required while still receiving material fed to it by the inclined conveyer of the stacker.

In the accompanying drawings, Figure 1 shows a side elevation of my improved stacker and shows by dotted lines some of the adjustments of the delivery conveyer.

Fig. 2 is a plan view of the apparatus shown in Fig. 1.

Fig. 3 is a diagram showing how the stacker may be associated with a plurality of "unit conveyers" and how material is supplied to said unit conveyers by other conveyers which are loaded from cars or other carriers.

My invention relates particularly to the stacker shown clearly in Figs. 1 and 2 of the drawings, while Fig. 3 shows diagrammatically one of the ways in which the stacker may be used in connection with conveyers which carry material to the stacker.

Referring more particularly to Figs. 1 and 2, it will be observed that the frame A of the stacker has a horizontal bottom portion $a$ mounted on wheels $a'$ and an inclined upper portion $a^2$ connected to the bottom frame by trusses $a^3$. In the upper part of the frame there is an endless conveyer belt B passing around a lower pulley $b$ and an upper pulley $b'$. C indicates a motor for driving said conveyer. Material is fed to the belt B from a hopper D at the lower end of the frame A.

The truck E has its wheels $e$ geared to motor $e'$ and the truck is coupled to the frame A at $x$. A turn-table $f$ is supported on the truck and on this turn-table is mounted a frame $g$ to which is pivotally connected the frame $h$ of the delivery conveyer belt $i$, which latter is driven by a motor $j$. The frame $h$ is pivotally connected at $k$ to the frame $g$ and is provided with segments of teeth $l$ geared to a motor $m$ by means of which the frame of the delivery conveyer may be moved vertically about its pivots $k$ in the manner indicated by dotted lines in Fig 1.

The conveyer B delivers to a chute G which supplies a hopper H on the frame of the delivery conveyer. By this organization material supplied to the hopper D is carried to the chute G and by way of the hopper H to the delivery conveyer belt and the material may be delivered at any desired elevation or in any desired vertical plane.

My improved stacker is especially useful in connection with what are known as unit conveyers, i. e., self-contained conveyers, each of which is truck supported, moved from place to place under its own power and wherein the conveyer belt is driven by its own motor. Fig. 3 illustrates one way in which the stacker may be associated with the unit conveyers and with a main conveyer which supplies the unit conveyers. In Fig. 3 S indicates the stacker, T a plurality of unit conveyers, and U a main conveyer belt. The main conveyer belt may be loaded or supplied in any suitable way. In Fig. 3 W indicates track hoppers and V indicates a car which may deliver to one of said hoppers. The conveyer belt U is provided with trippers $u$ delivering to a hopper $u'$. Each unit conveyer T comprises a truck $t$ supporting a suitable frame $t'$ which carries an endless belt $t^2$ driven by a motor $t^3$. The wheels of the truck are driven by motor mechanism $t^4$. Each unit conveyer is provided with a hopper $t^5$ which receives material to be conveyed. Each unit conveyer may be moved from place to place under its own power and its conveyer belt is operated independently of any other conveyers with which it is associated. Fig. 3 shows three unit conveyers on a track Y. Two of these conveyers are shown in position to be used, while the third conveyer is out of use, but ready to be brought into operation when required. Any number of unit conveyers may thus be held in reserve and moved into proper position when needed. For instance, if the stacker S be moved farther away from the conveyer belt U as shown in the drawings, it is necessary to employ an additional unit conveyer. It is obvious that the two conveyers shown as being associated with the stacker may be moved with the stacker to the desired position and a third unit conveyer may be brought under the hopper $u'$ and receive material therefrom. Each unit conveyer delivers to the unit conveyer immediately in front of it, except the first one in the series, which, of course, delivers to the stacker. It will thus be seen that the stacker may be operated independently of the unit conveyers and the unit conveyers may be operated independently of either the stacker or the main conveyer. It is also obvious that when circumstances prevent, the unit conveyers may be discarded and the hopper of the stacker may be placed directly under a hopper receiving material from another conveyer belt, but it is important to observe that the conveyers on the stacker operate independently of any other conveyers. I do not in this application make claims for the construction of the unit conveyers, as the novel features of such conveyers are claimed in my application for patent filed May 4, 1918, No. 232,514.

I claim as my invention:—

1. Apparatus for storing materials, comprising a truck-supported frame having a horizontally arranged wheel-supported lower portion and an inclined upper portion, an endless inclined conveyer belt having a delivery portion arranged above the inclined part of the frame and a return portion arranged immediately below said inclined part of the frame, pulleys at the upper and lower ends of said frame around which the endless conveyer belt passes, motor mechanism on said frame for driving said belt, a delivery conveyer associated with said inclined conveyer belt and receiving material from its upper end, an automobile truck connected with said before-mentioned conveyer frame, a turn-table on said truck, motor mechanism for operating the turn-table, a frame supported by the turn-table to which the delivery conveyer is connected to move about a horizontal axis, and motor mechanism for thus turning the delivery conveyer.

2. Apparatus for storing materials, comprising a truck-supported frame having a horizontally arranged lower portion and an inclined upper portion, an endless inclined conveyer belt having a delivery portion arranged above said inclined portion of the frame and a lower portion immediately beneath it, a motor on the inclined frame for driving said belt, pulleys at the upper and lower ends of said frame around which said endless conveyer belt passes, a hopper at the lower end of the frame which delivers to said inclined conveyer belt, a delivery conveyer associated with the inclined conveyer belt, a turn-table on which said delivery conveyer is mounted to move about a horizontal axis, a truck supporting said delivery conveyer, motor mechanism on the truck for propelling it, and motor mechanism on the turn-table for turning it about its vertical axis.

3. Apparatus for storing materials, comprising a truck-supported frame having a horizontal lower portion and an inclined upper portion, pulleys at the upper and lower ends of said inclined upper portion, an endless conveyer belt terminating at said pulleys at each end and mounted to move with one portion above the inclined frame and the other portion below it, motor mechanism carried by said frame for operating said belt, an automobile truck coupled to said supporting frame, a turn-table thereon, a boom conveyer carried by the turn-table and mounted to move about a horizontal axis, and means for transferring material from the upper end of the inclined conveyer to said boom conveyer.

4. A self-contained stacker, comprising an automobile truck, a turn-table thereon, a boom conveyer mounted on the turn-table to turn about a horizontal axis, motor mechanism carried by the turn-table for moving the boom conveyer about its horizontal axis, a wheeled frame connected with said automobile truck and which has an upper portion overhanging the inner end of the boom conveyer and a lower portion near the ground level, an endless conveyer belt terminating at the lower end of the frame, and at the end of the overhanging portion thereof where it delivers to the boom conveyer, and motor mechanism on the frame for operating said belt.

In testimony whereof, I have hereunto subscribed my name.

FRANCIS LEE STUART.